(12) United States Patent
Lemieux

(10) Patent No.: US 6,672,435 B2
(45) Date of Patent: Jan. 6, 2004

(54) SHOCK ABSORBER ADJUSTABLE IN COMPRESSION

(75) Inventor: René Lemieux, Granby (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 10/082,347

(22) Filed: Feb. 26, 2002

(65) Prior Publication Data

US 2002/0189913 A1 Dec. 19, 2002

Related U.S. Application Data

(60) Provisional application No. 60/270,878, filed on Feb. 26, 2001.

(51) Int. Cl.[7] .................................................. F16F 9/34
(52) U.S. Cl. ...................................................... 188/289
(58) Field of Search ........................... 188/266.2, 282.1, 188/282.6, 289, 314

(56) References Cited

U.S. PATENT DOCUMENTS

| 4,936,424 A | * | 6/1990 | Costa ........................... 188/299 |
| 5,522,483 A | * | 6/1996 | Koch ........................... 188/299 |
| 5,542,509 A |   | 8/1996 | Bell |
| 5,664,649 A | * | 9/1997 | Thompson et al. .......... 188/314 |
| 5,810,128 A | * | 9/1998 | Eriksson et al. ............. 188/289 |
| 5,911,290 A | * | 6/1999 | Steed ........................ 188/282.4 |
| 6,213,262 B1 | * | 4/2001 | Bell ........................... 188/315 |
| 6,360,857 B1 | * | 3/2002 | Fox et al. .................... 188/281 |

* cited by examiner

Primary Examiner—Christopher P. Schwartz
(74) Attorney, Agent, or Firm—Pillsbury Winthrop LLP

(57) ABSTRACT

An adjustable shock absorber includes a shock rod having a longitudinal axis. A shock body is disposed around a portion of the shock rod, the shock body defining a first fluid chamber therein and being slidable along the longitudinal axis. A piston is disposed on the shock rod in sealing engagement with the shock body. The piston has at least one channel therethrough in communication with the first fluid chamber. At least one valve is in fluid communication with the channel to control fluid movement through the channel. A support is movable longitudinally along the shock rod and is disposed adjacent to the valve. An adjustment mechanism is provided for altering a longitudinal position of the movable support to adjust the valve's operation by altering the fluid movement through the channel.

12 Claims, 11 Drawing Sheets

SHOCK ABSORBER ADJUSTABLE IN COMPRESSION

This application claims priority to U.S. application Ser. No. 60/270,878, filed Feb. 26, 2001, which is incorporated herein by reference.

FIELD OF THE INVENTION

The field of the present invention relates to shock absorbers of the type that are adjustable. More particularly, the present invention relates to shock absorbers that are adjustable in the compression stage only.

BACKGROUND OF THE INVENTION

Shock absorbers are widely use to dampen shocks experienced, for example, when a recreational vehicle such as a snowmobile travels over rough terrain. In the case of the snowmobile, the shock absorbers are positioned between the chassis and the slide frame around which an endless track rotates to propel the vehicle or in the front suspension between the skis and the chassis. The shock absorbers allow the slide frame or the skis to compress towards the chassis at a controlled rate.

Shock absorbers typically have a cylindrical wall sealed between two end caps creating a cavity in which a fluid is contained to provide hydraulic damping. The interior of the cylinder is separated into two sections by a piston, which contains passages therethrough to increase or decrease the fluid flow between each section of the cylinder. A shock rod, which passes through the rod eye end cap, is attached to the piston at one end and to the vehicle at its other end. Normally the shock rod is attached to the vehicle through a rod eye, hence the name "rod eye end cap". The other end cap is secured to the slide frame, in the case of a snowmobile. The shock rod and the shock body, which includes the cylindrical wall and both of the end caps, move in relation to one another to dampen any forces applied thereto.

Passages are formed through the longitudinal axis of the piston and connect one section of the cylinder, the shock body, to the other. Portions of these passages are covered with leaf valves while the remainder of the openings serve as a bypass with no restriction other than the diameter of the passages. These bypass portions function primarily when the speed of the piston is low, i.e.: 0 to 0.3 m/s. The "speed" of a piston is the rate at which the piston and the shock body move with respect to one another when an external force is applied thereto. In certain shock absorbers, once the speed of the piston increases above 0.3 mls, the fluid pressure increases enough to open the leaf valves. This may vary depending on the intended use of the shock absorber.

A typical "Piston Speed vs. Compression Force" graph, such as the one depicted in FIG. 8, may be divided into three sections: low, medium and high. The low speed curve corresponds to speeds from about 0 m/s to approximately 0.3 m/s. The medium speed range corresponds to speeds from about 0.3 m/s to 1 m/s, and the high-speed range corresponds to speeds higher than about 1 m/s.

Because the lower speeds do not have an adverse effect on the driver or the driving performance of the snowmobile, the medium and high-speed ranges tend to be where attention is focused when designing a shock absorber. Since the fluid inside the shock body travels across the piston through the bypass portions during the low speed range, any adjustments to the valves have little or no effect on the low speed functioning of the shock.

Conventional adjustable hydraulic shock absorbers, such as the one shown in U.S. Pat. No. 5,542,509, are adjustable in both the compression and in the rebound stages. The compression stage occurs when the vehicle encounters uneven terrain and the force generated by the encounter is transferred to the piston of the shock absorber. The rebound stage is the traveling of the piston back to its steady state position, normally by the aid of a coil spring. The coil spring, which compresses when the vehicle encounters uneven terrain, will force the vehicle away from the ground and generate the force required to return the shock absorber to its steady state position during the rebound stage. The force exerted by the spring is usually quite low, because the force of the spring only needs to be high enough to overcome the force of gravity and not the forces associated with uneven terrain.

U.S. Pat. No. 5,542,509 describes a twin-tube shock absorber with an adjustment mechanism. The adjustment mechanism is a screw cam, which is screwed into a bore in the endcap of the shock absorber. The screw cam abuts the spring seat for the compression or blow off valve spring. Tightening or loosening the screw cam, relative to the endcap, increases or decreases the pre-load of the compression valve spring, thereby adjusting the manner in which the shock absorber responds to compression forces applied thereto.

In the case where a shock absorber is used in a recreational vehicle, such as a snowmobile, the compression stage of the shock absorber has a greater effect on the vehicle than the rebound stage. As mentioned, this is due to the fact that the weight of the vehicle is relatively small and, therefor, the rebound force required is equally small. This stands in dramatic contrast to the very high compressive forces that the shock absorber may experience as the recreational vehicle traverses uneven terrain.

Additionally, different riders prefer different response characteristics of the shock absorbers on their vehicles. For example, those engaged in snowmobile racing prefer a "stiffer" shock than those enjoying a leisurely excursion on the outdoor snowmobile trail or through an ungroomed rural setting.

SUMMARY OF THE INVENTION

A need has developed for a simple, effective mechanism that permits adjustment of the compression response of a shock absorber such that the recreational vehicle including the shock absorber may satisfy several different riding preferences. The prior art does not address this deficiency.

It is, therefore, an object of the present invention to provide a simple, cost-effective, reliable, adjustable shock absorber with improved characteristics.

It is another object of the present invention to provide a shock absorber that is adjustable in compression in medium and high piston speed ranges.

It is still an object of the present invention to provide an adjustable shock absorber that is adjustable electrically using a solenoid.

It is yet another object of the present invention to provide an adjustable shock absorber, which is adjustable hydraulically.

It is still another object of the present invention to provide an adjustable shock absorber, which is adjustable mechanically.

In furtherance of these objects, one aspect of the present invention is to provide an adjustable shock absorber having a shock rod with a longitudinal axis. A shock body is disposed around the shock rod and is slidable along the longitudinal axis of the shock rod. The interior of the shock body defines a first fluid chamber. A piston is disposed on the shock rod in such a manner that the piston sealingly engages with the interior of the shock body. The piston includes channels passing therethrough in communication with the first fluid chamber. At least one valve is positioned to be in communication with the channel to control fluid movement through the channel. A support, movable longitudinally on the shock rod, is disposed adjacent to the valve. An adjustment mechanism is provided for altering the position of the movable support to adjust the fluid movement through the channel.

Yet another aspect of the of the present invention is to provide an adjustable shock absorber including a solenoid, which alters the fluid movement through the channel in the piston.

According to yet another aspect of the present invention, a snowmobile is provided that includes a chassis. An engine is disposed on the chassis. A steering column is attached to at least one ski for steering the snowmobile over the snow. An endless track is disposed under the chassis and is operatively connected to the engine for propelling the snowmobile. The snowmobile includes an adjustable shock absorber. The adjustable shock absorber has a shock rod with a longitudinal axis. A shock body is disposed around the shock rod and is slidable along the longitudinal axis of the shock rod. The shock body defines a first fluid chamber. A piston is disposed on the shock rod in such a manner that the piston sealingly engages with interior of the shock body. The piston includes channels passing therethrough in communication with the first fluid chamber. At least one valve is in communication with the channel to control fluid movement through the channel. A support, movable longitudinally on the shock rod, is disposed adjacent the valve. An adjustment mechanism is provided for altering the position of the movable support to adjust the fluid movement through the channel.

Yet another aspect of the present invention is to provide a snowmobile with an adjustable shock absorber that includes a solenoid which alters the fluid movement through the channel in the piston.

The foregoing objects are not meant to limit the scope of the present invention. To the contrary, still other objects of the present invention will become apparent from the description that follows.

BRIEF DESCRIPTION OF THE DRAWINGS

Reference will be made hereinafter to the accompanying drawings, which illustrate embodiments of the present invention discussed herein below, wherein.

DETAILED DESCRIPTION OF THE PREFERRED EMBODIMENTS

An adjustable shock absorber 10 according to the present invention is shown in FIGS. 1–11. The shock absorber 10 is preferably made from steel or aluminum and is circular in shape. However, the shock absorber 10 could be made in any shape and from any suitable material(s) capable of withstanding shocks experienced in the environment in which the shock absorber is designed to operate.

Figure 1:
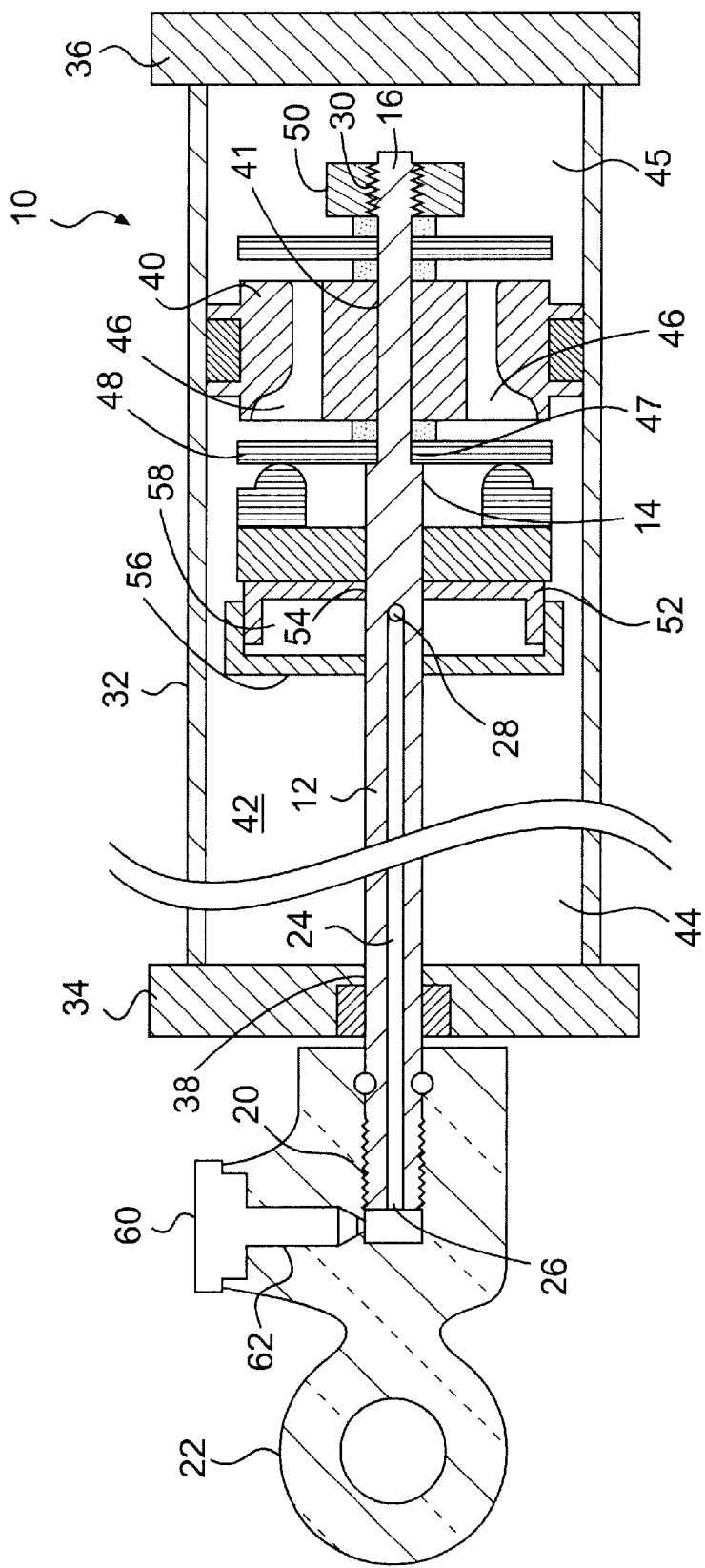
FIG. 1 is a cross sectional side view of a first embodiment constructed in accordance with the present invention.

In the embodiment illustrated in FIG. 1, the shock rod 12 of the adjustable shock absorber 10 is cylindrical in shape with a shoulder 14 separating the lower portion 16 from the upper portion 18. The upper portion 18 of the shock rod 12 includes a first set of threads 20 to which the rod eye 22 is attached. The upper portion 18 of shock rod 12 also includes a passage 24 through the center. The passage 24 has a first opening 26 near the threads 20 and a second opening 28 near the shoulder 14 of the shock rod 12. The lower portion 16 of the shock rod 12 has a second set of threads 30. The second set of threads 30 engages a nut 50 to secure a piston 40 to the shock rod 12. The shock rod 12 is preferably made from steel, but other materials may be suitable therefor.

A shock body 32 is preferably made of aluminum with a circular cross-section. The shock body 32 is connected between a first end cap 34 and a second end cap 36. The end caps 34 and 36 are preferably threaded into the shock body 32, but other methods of attachment are available. The first end cap 34 includes a hole 38 through which the shock rod 12 passes. The hole 38 is sealed such that no fluid will exit between the shock rod 12 and end cap 34.

Piston 40 is preferably circular in cross-section to facilitate a sealing engagement with the interior of the shock body 32. The piston 40 is preferably situated on the lower portion 16 of shock rod 12. The piston 40 has a round central hole 41 through which the shock rod 12 passes. The piston 40 moves longitudinally inside the shock body 32 to separate the first fluid chamber 42 into two communicating sections 44 and 45. The piston 40 includes a plurality of channels 46 through which the two communicating sections 44 and 45 communicate with one another. Preferably, the piston 40 is held stationary on the shock rod 12 between the shoulder 14 and the nut 50, but other methods of attachment are available.

A valve 48 is preferably shaped like a circular disk made of a flexible metal material, but other valves are available. The valve 48, preferably situated so that it extends around the perimeter of the piston 40, alters the opening of the channels 46 between the two communicating sections 44 and 45 of the first fluid chamber 42. The valve 48 also has a round central hole 47 through which the shock rod 12 passes. In the preferred embodiment, the valve 48 is constructed to flex when pressure is applied thereto.

In the embodiment illustrated in FIG. 1, a movable support 52 is preferably shaped like a truncated cylinder. The movable support 52 is situated on the upper portion 18 of the shock rod 12. The movable support 52 has a round central hole 54 through which the shock rod 12 passes. The round central hole 54 sealingly engages the shock rod 12. The movable support 52 is slidable along the shock rod 12 such that it makes contact with the valve 48 when the valve 48 opens. Preferably, the movable support 52 is made of aluminum, but other materials are available. In the embodiment depicted, the movable support 52 is sealingly engaged with a support housing 56 to form a second fluid chamber 58. The support housing 56 is attached to the shock rod 12 in such a manner that no fluid will leak between the support housing 56 and the shock rod 12. The second fluid chamber 58 is in fluid communication with the passage 24 within the shock rod 12.

A screw 60 is placed into a hole 62 in the rod eye 22, which is attached to the shock rod 12 by first set of threads 20. The passage 24 through the shock rod 12 is also in fluid communication with the threaded hole 62 of the rod eye 22. When screw 60 is rotated in threaded hole 62 and moves toward the passage 24, the volume of liquid, preferably hydraulic, is displaced through the passage 24 in the shock rod 12 into the second fluid chamber 58. The increase in volume of fluid within the second fluid chamber 58 causes the movable support 52 to travel along the longitudinal axis of the shock rod 12 and, thus, narrows the gap between the movable support 52 and the valve 48 to reduce the allowable movement of the valve 48.

Another embodiment of the present invention involves connecting passage 24 to an external source providing preferably hydraulic fluid to the passage 24. A control for controlling the amount of fluid entering and exiting the passage 24 is preferably situated on the dashboard of the vehicle or near the operator while driving the vehicle.

Figure 2:
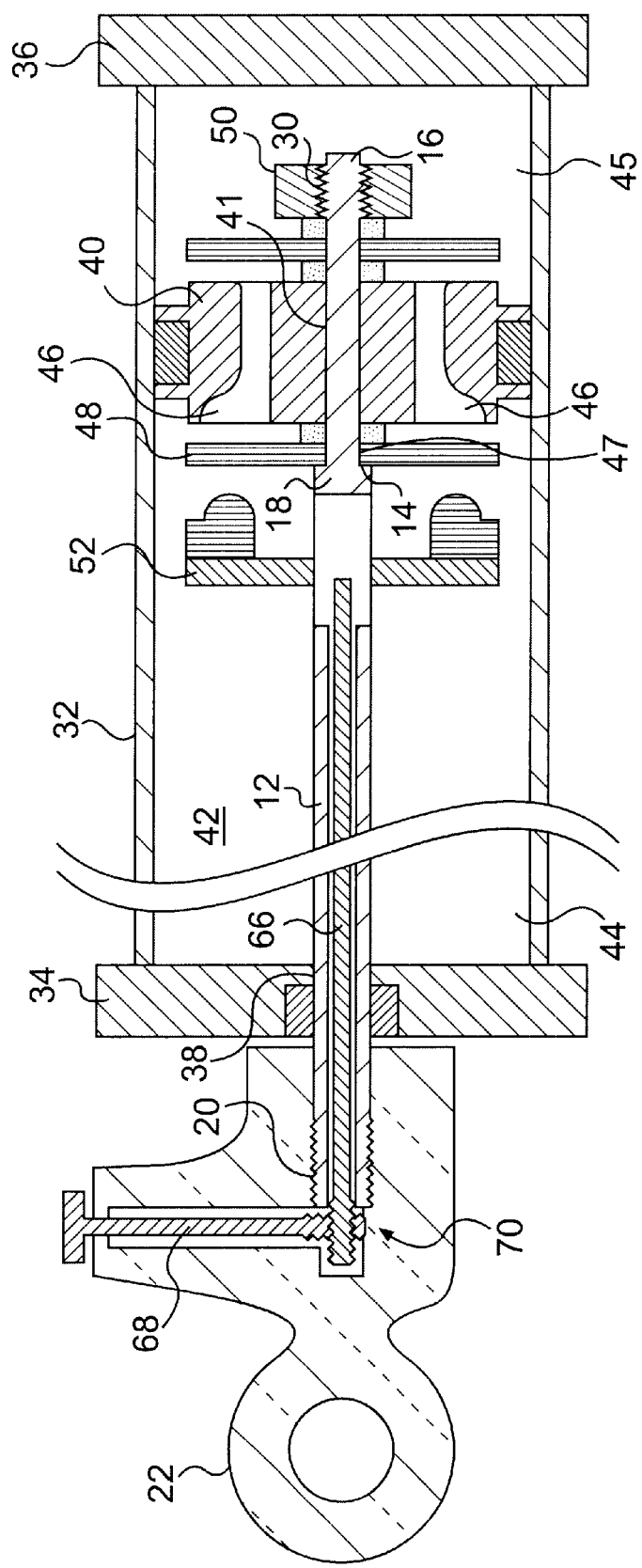
FIG. 2 is a cross sectional side view of a second embodiment of the present invention.

In still another embodiment of the present invention shown in FIG. 2, a first rod 66 extends through the passage 24 in the shock rod 12. A second rod 68 passing through the hole 62 in the rod eye 22 is attached to the first rod 66 preferably through a worm gear 70. Rotation or translation of the second rod 68, causes the first rod 66 to extend further into the shock rod 12 towards the piston 40. The movable support 52 is attached to the first rod 66. Movement of the first rod 66 in the longitudinal direction translates into movement of the movable support 52 also in the longitudinal direction of the shock rod 12 and, thus, narrows the gap between the movable support 52 and the valve 48 to reduce the allowable movement of the valve 48.

Figure 3:
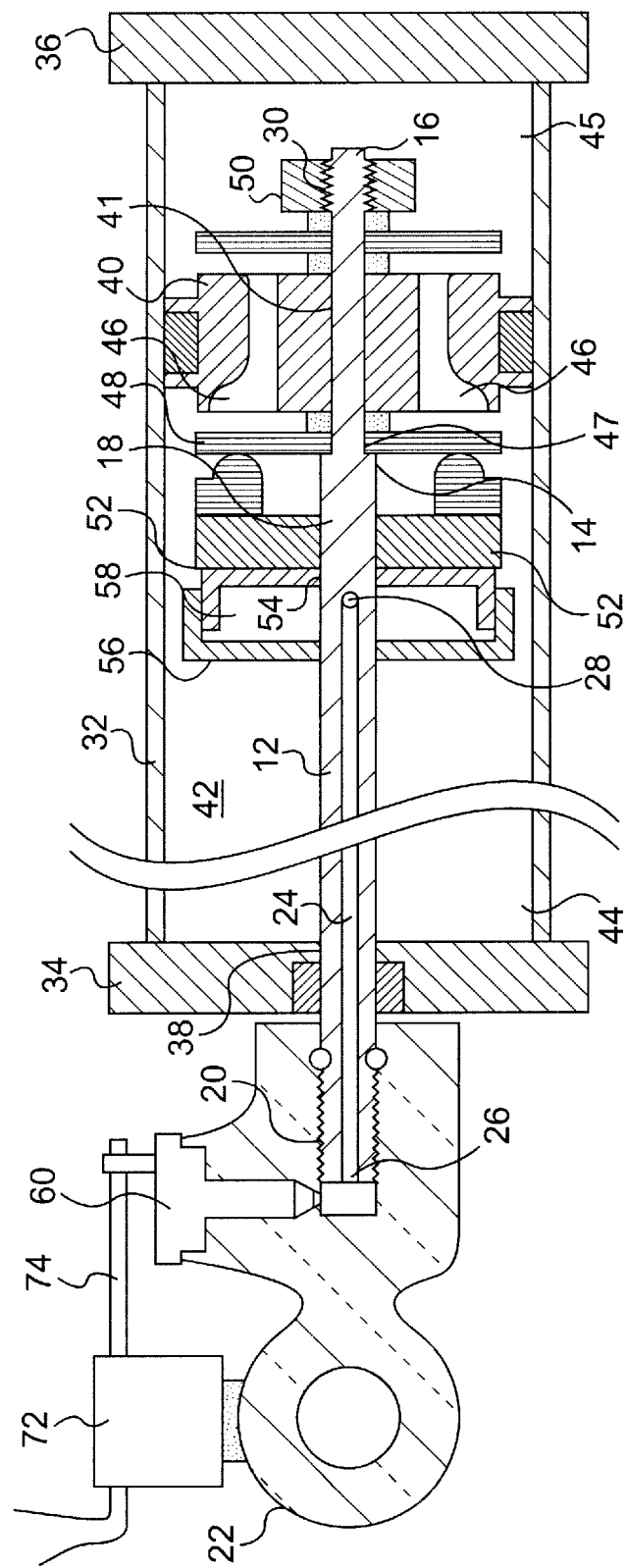
FIG. 3 is a cross sectional side view of a third embodiment of the present invention.

In yet another embodiment of the present invention shown in FIG. 3, a solenoid 72 may be attached to the screw 60 by a mechanical linkage or plunger 74. Actuation of the solenoid 72 rotates the screw 60 through the mechanical linkage 74. Rotation of the screw 60 causes the volume of fluid within the second fluid chamber 58 to increase which causes the movable support 52 to travel along the longitudinal axis of the shock rod 12 and, thus, narrows the gap between the movable support 52 and the valve 48 to reduce the allowable movement of the valve 48. Although shown as a linear solenoid, a rotational solenoid could be used as well.

Figure 4:
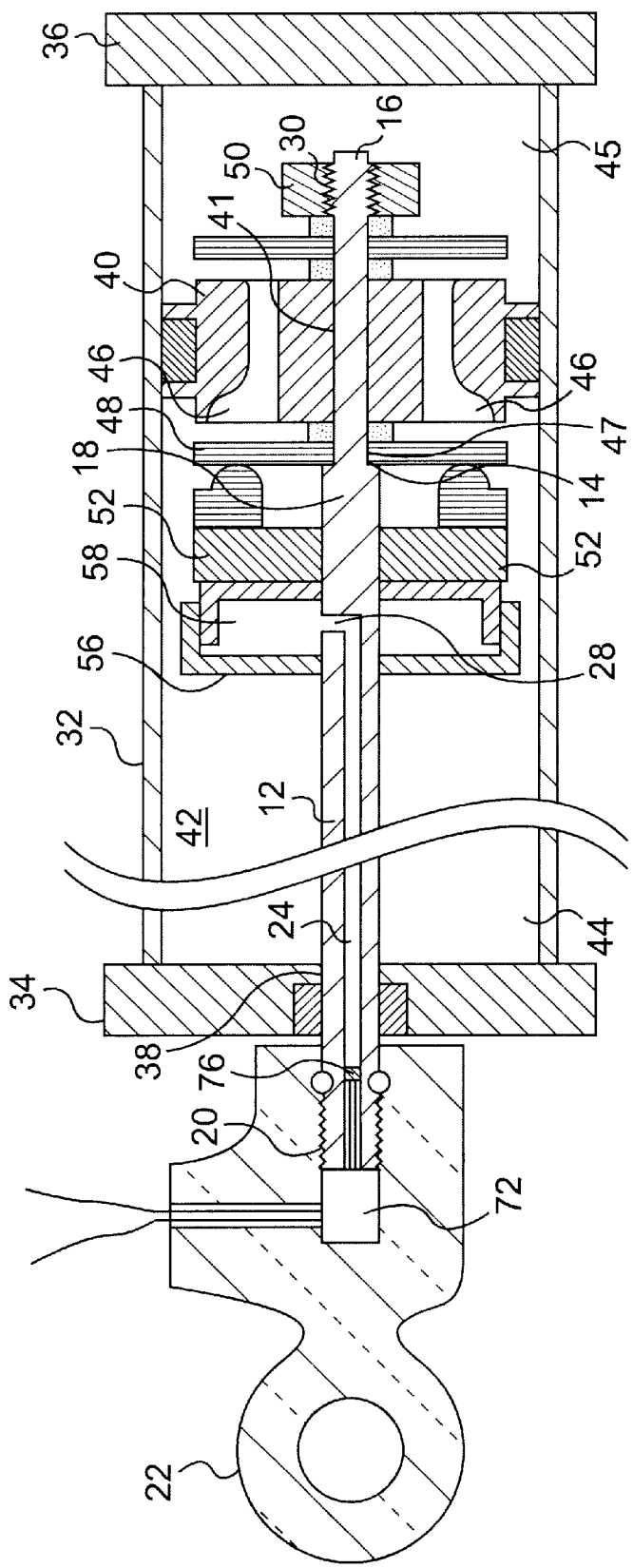
FIG. 4 is a cross sectional side view of a fourth embodiment of the present invention.

In still another embodiment of the present invention shown in FIG. 4, a solenoid 72 is placed within the passage 24. Attached to the solenoid 72 is a second piston 76 sealingly engaged with the passage 24. Actuation of the solenoid 72 alters the fluid pressure with in the passage 24 causing the movable support 52 to travel along the longitudinal axis of the shock rod 12 and, thus, narrowing the gap between the movable support 52 and the valve 48 to reduce the allowable movement of the valve 48.

Figure 5:
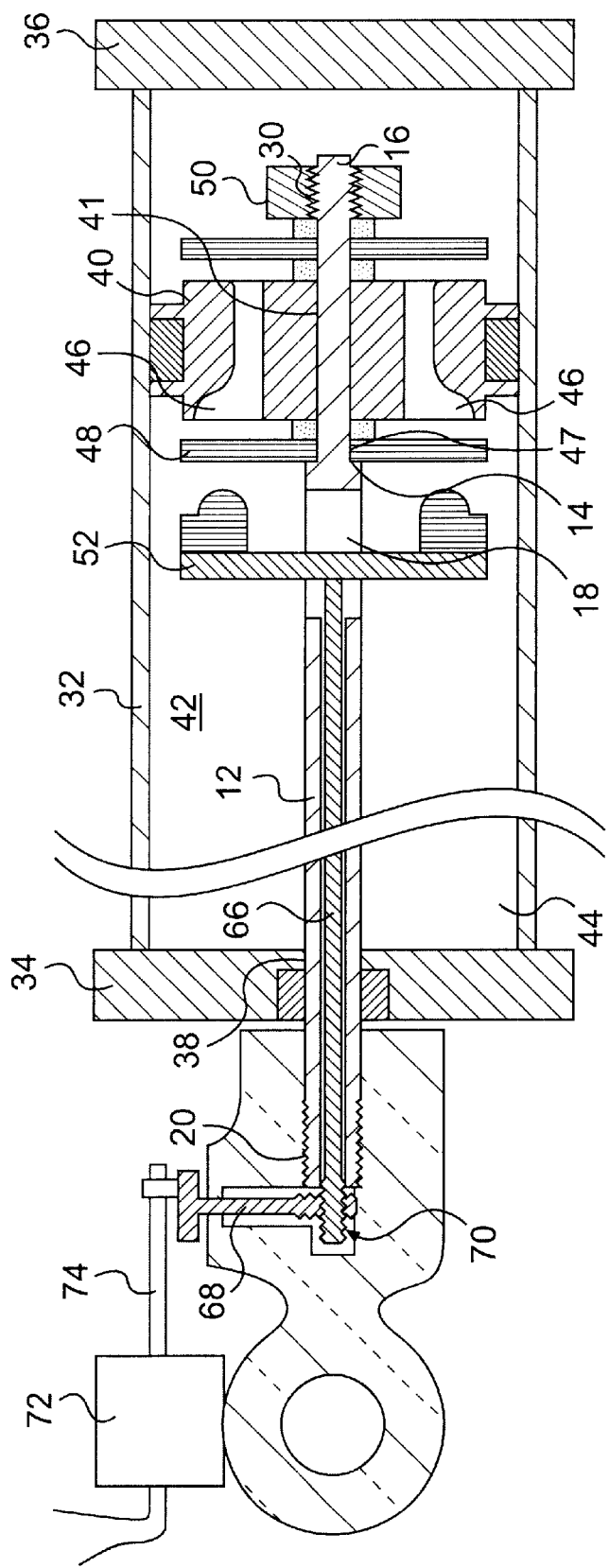
FIG. 5 is a cross sectional side view of a fifth embodiment of the present invention.
Figure 6:
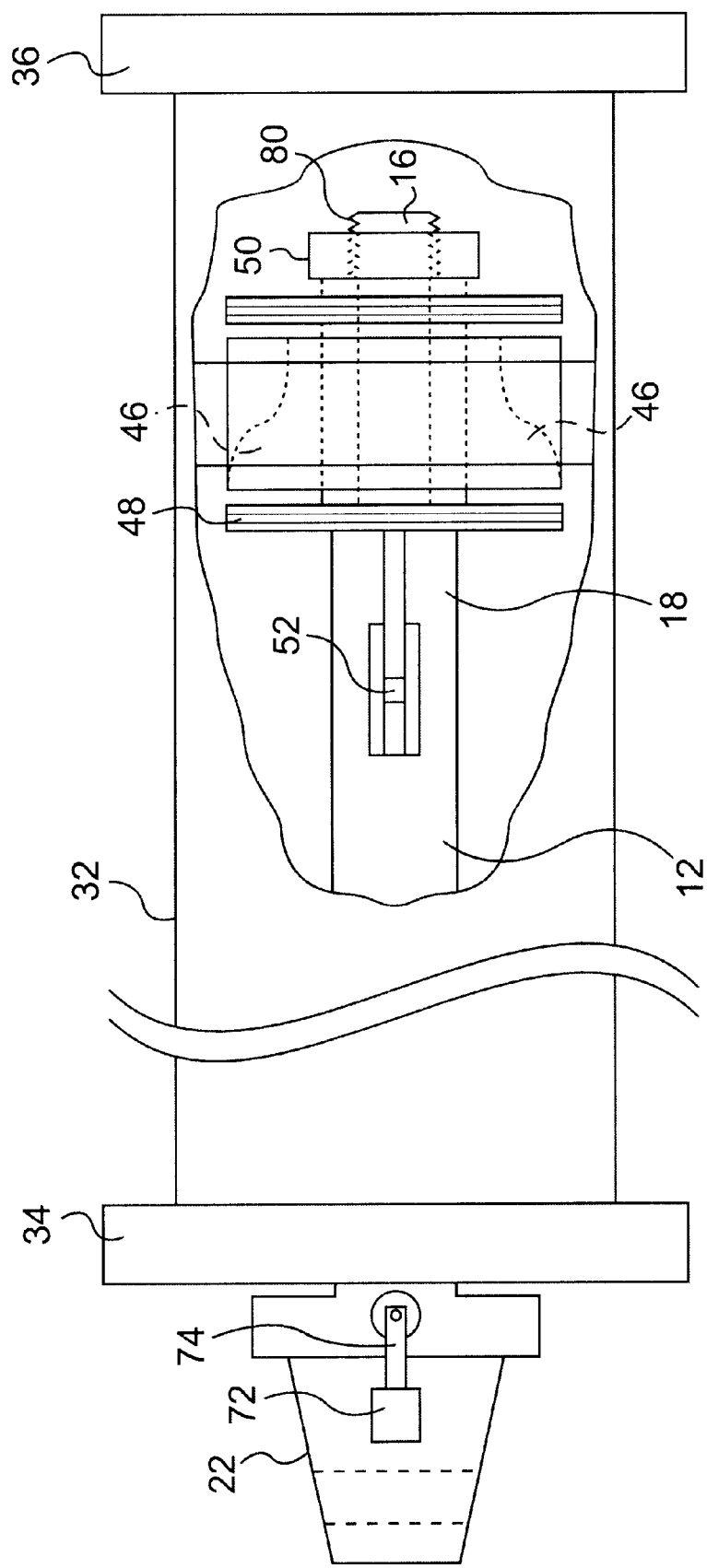
FIG. 6 is a top view of the fifth embodiment illustrated in FIG. 5.

In yet another embodiment of the present invention, which is illustrated in FIGS. 5 and 6, a mechanical linkage 74 attaches a solenoid 72 to the second rod 68. Actuation of the solenoid 72 rotates the second rod 68 through the mechanical linkage 74. The second rod 68, passing through the hole 62 in the rod eye 22, is preferably attached to the first rod 66 through a worm gear 70. Rotation of the second rod 68, causes the first rod 66 to extend further into the shock rod 12 toward the piston 40. The movable support 52 is attached to the first rod 66. Movement of the first rod 66 in the longitudinal direction translates into movement of the movable support 52 also in the longitudinal direction of the shock rod 12 and, thus, narrows the gap between the movable support 52 and the valve 48 to reduce the allowable movement of the valve 48.

Figure 7:
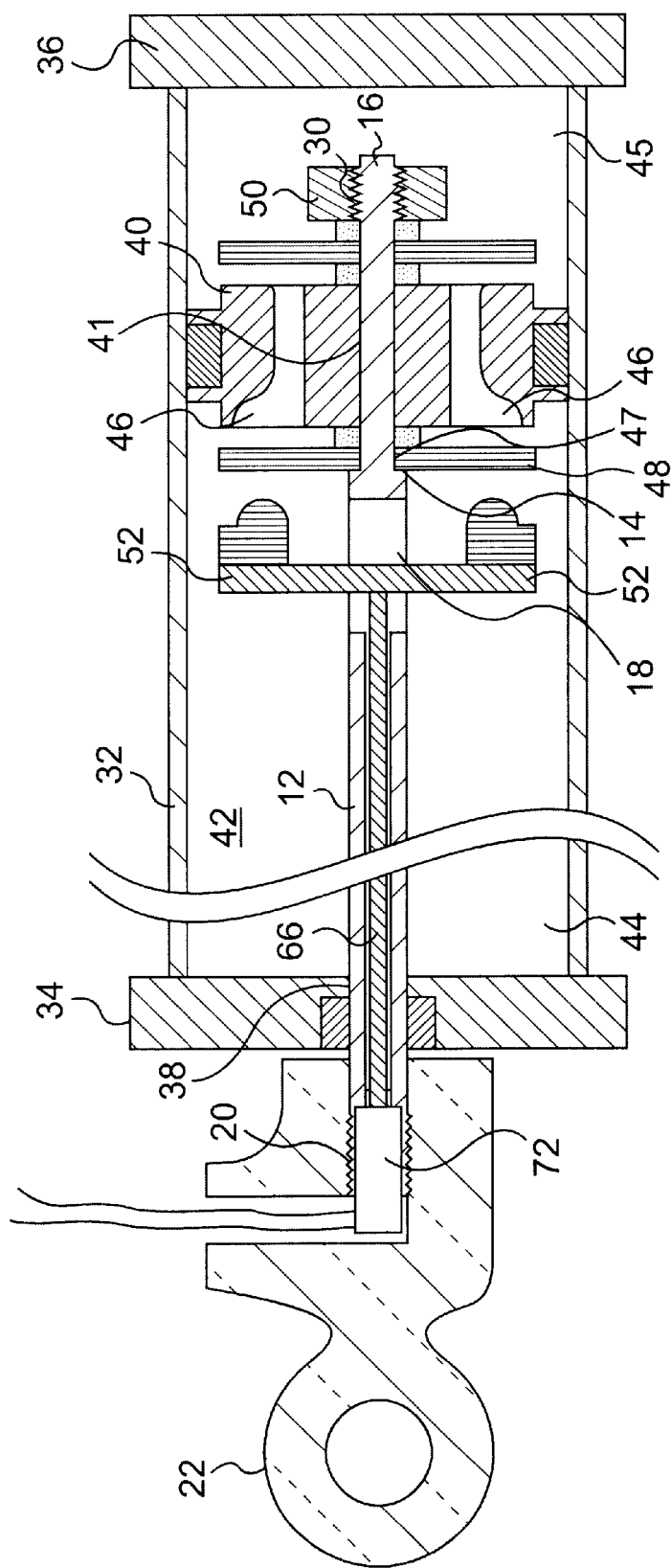
FIG. 7 is a cross sectional side view of a sixth embodiment of the present invention.
Figure 8:
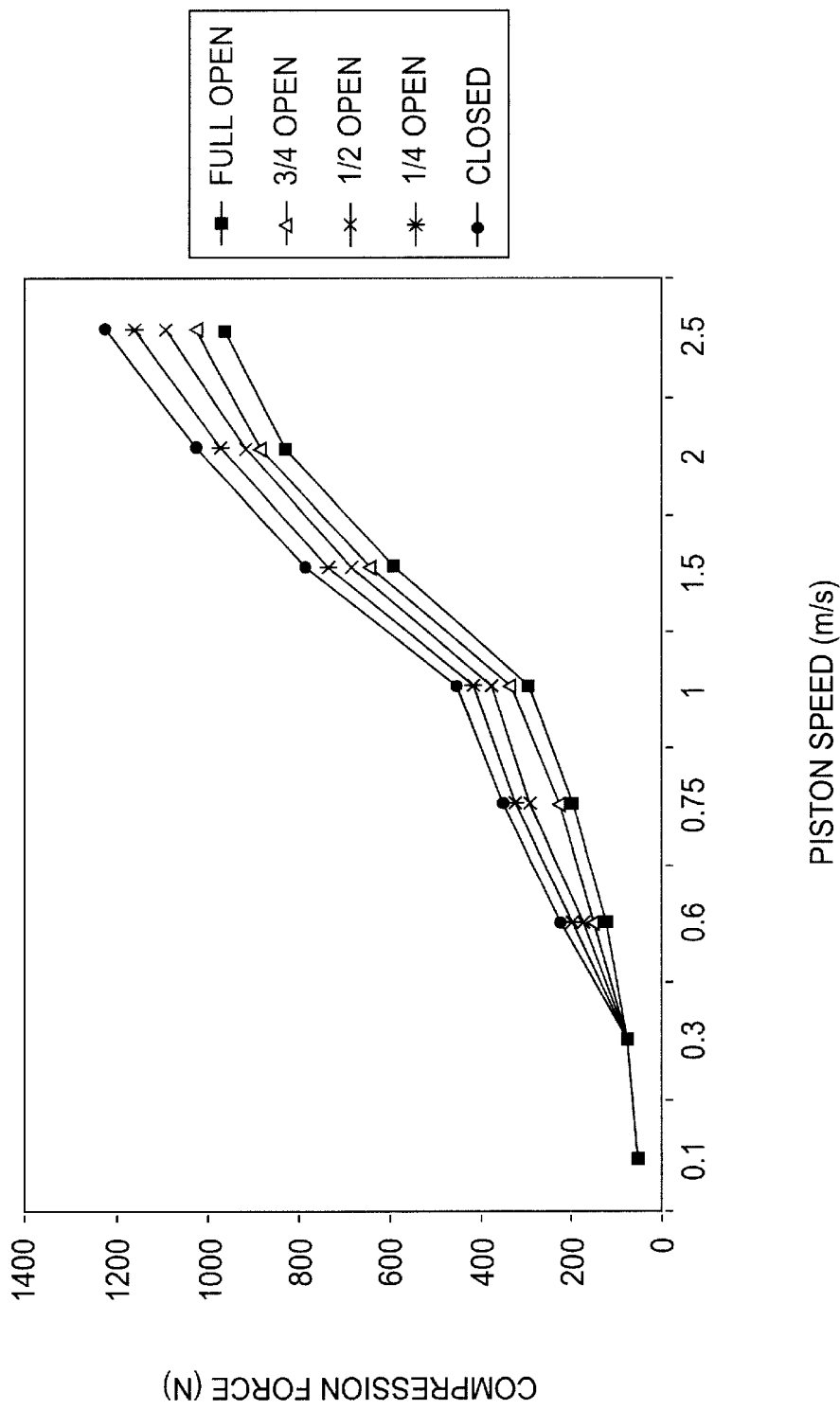
FIG. 8 is a "Piston Speed vs. Force" graph.

In yet another embodiment of the present invention illustrated in FIG. 7, the solenoid 72 is directly attached to the movable support 52. Actuation of the solenoid 72 in the longitudinal direction translates into movement of the movable support 52 also in the longitudinal direction of the shock rod 12 and, thus, narrows the gap between the movable support 52 and the valve 48 to reduce the allowable movement of the valve 48. Movement of the movable support 52 away from the valve 48 is also permitted to increase the allowable movement of the valve 48.

Figure 9:
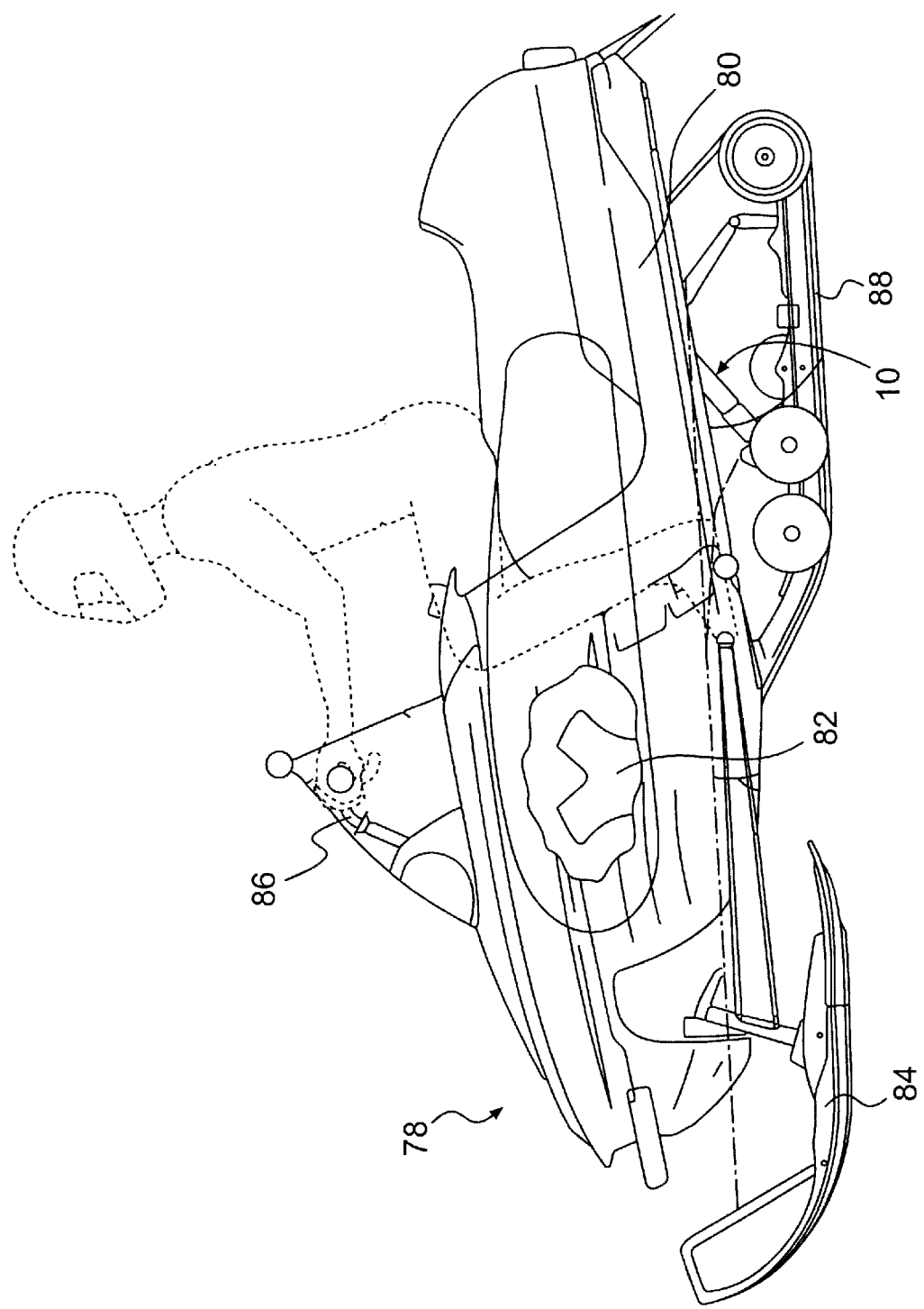
FIG. 9 is a side view of a snowmobile with an adjustable shock absorber.
Figure 10:
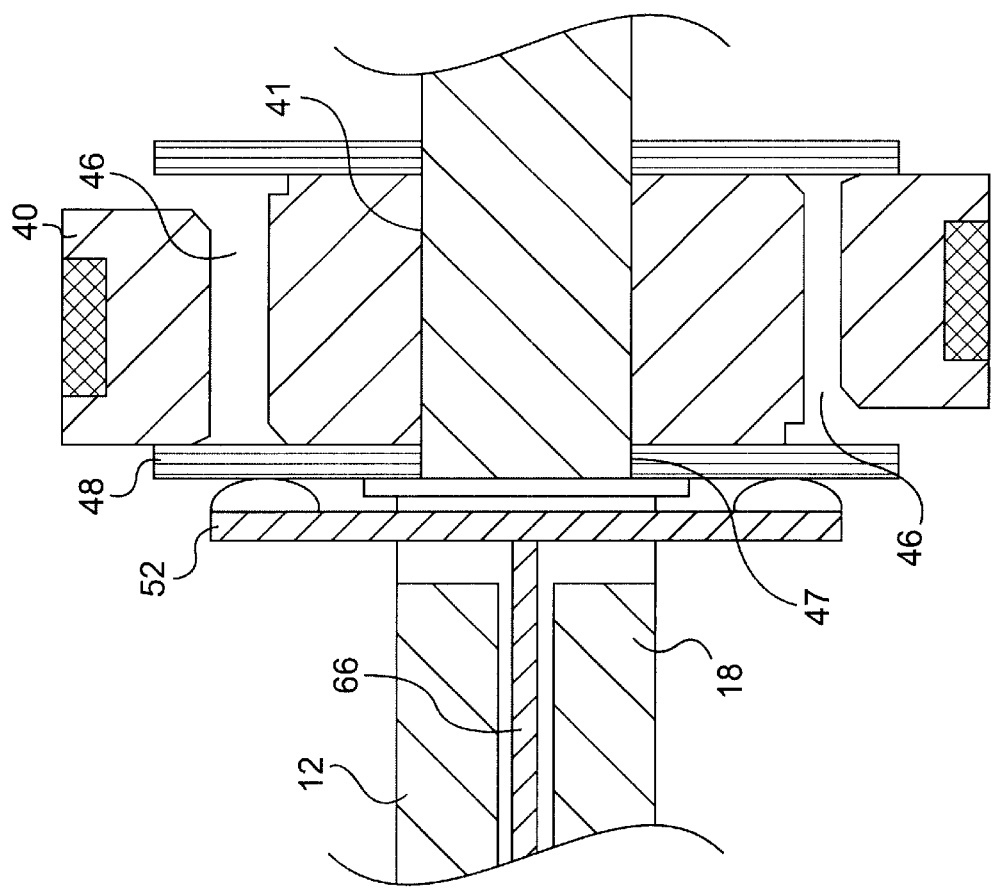
FIG. 10 is a partial cross sectional view showing the piston and movable support of the second, fifth and sixth embodiments in greater detail.
Figure 11:
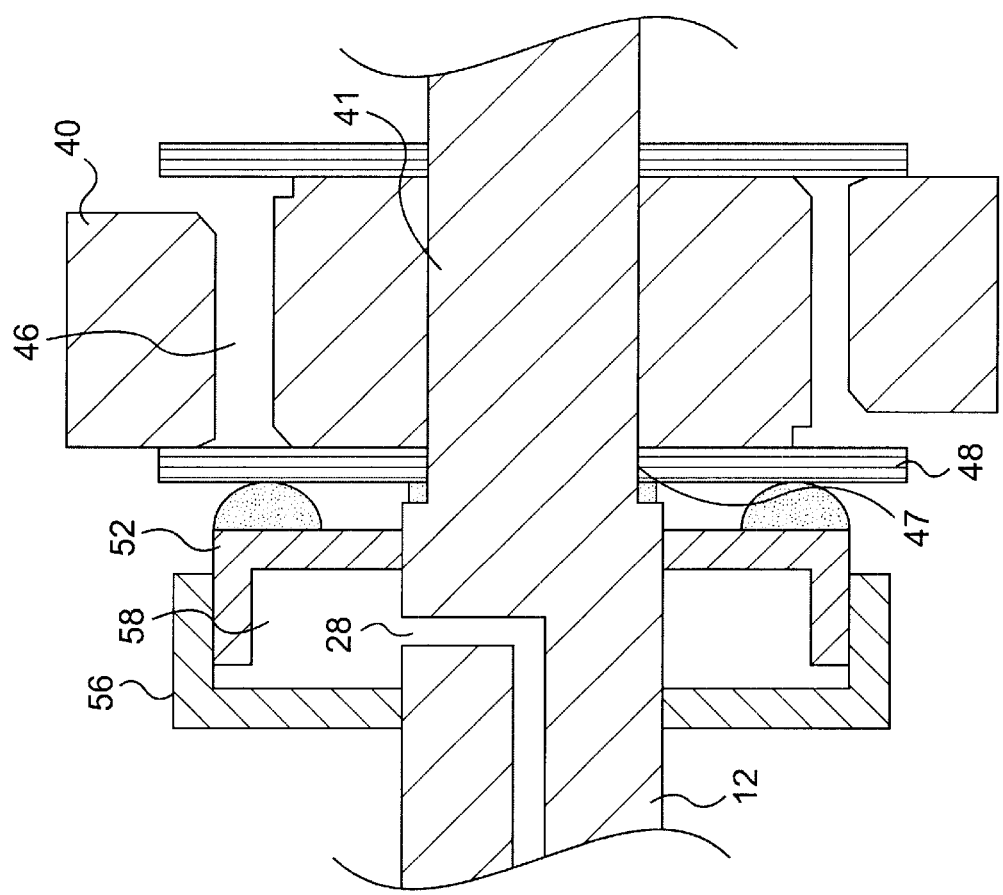
FIG. 11 is a partial cross sectional view showing the piston and movable support of the first, third and fourth embodiments in greater detail.

The adjustable shock absorber 10 of the present invention may be used on any suitable vehicle including a snowmobile 78, which is shown in FIG. 9. Snowmobile 78 has a chassis 80 on which the engine 82 is disposed. A pair of skis 84 (only one of which is depicted in FIG. 9) are attached to the front portion of the chassis 80 and are connected to a steering device 86 to steer the snowmobile 78 across a snow-covered surface. An endless track 88, connected to the engine 82, is placed under the chassis 80 to propel the snowmobile 78. The snowmobile 78 includes an adjustable shock absorber 10 as described above.

While the above mentioned embodiments have placed the second rod 68 and the screw 60 in the rod eye 22, it will be recognized that these components could be placed in the shock rod 12 or any part which does not move with respect to the shock rod 12.

While the invention has been described with reference to several preferred embodiments, it will be understood by those skilled in the art that various changes may be made and equivalents may be substituted for elements thereof without departing from the spirit and scope of the present invention.

What is claimed is:

1. An adjustable shock absorber, comprising:
   a shock rod having a longitudinal axis;
   a shock body disposed around a portion of the shock rod, the shock body defining a first fluid chamber therein and being slidable along the longitudinal axis;
   a piston disposed on the shock rod in sealing engagement with the shock body, the piston having at least one channel therethrough in communication with the first fluid chamber;
   at least one valve in fluid communication with the at least one channel to control fluid movement through the at least channel;
   a support movable longitudinally along the shock rod and disposed adjacent to the valve; and
   an adjustment mechanism for altering a longitudinal position of the support to adjust the valve's operation thereby altering the fluid movement through the at least one channel, the adjustment mechanism comprising:
      a support housing disposed on the shock rod adjacent the support, wherein the support sealingly engages with the support housing to define a second fluid chamber;

a fluid passage defined within the shock rod extending from the second fluid chamber to a position along the shock rod exterior to the shock body; and a screw communicating with a portion of the fluid passage exterior to the shock body, wherein adjustment of the screw alters fluid pressure within the fluid passage and second fluid chamber, thereby causing the support to slide along the longitudinal axis in response thereto.

2. The adjustable shock absorber of claim 1, further comprising:

a solenoid that moves the support along the longitudinal axis; and a linkage between the solenoid and the screw, wherein actuation of the solenoid rotates the screw to alter fluid pressure within the fluid passage and the second fluid chamber, thereby causing the support to slide along the longitudinal axis in response thereto.

3. The adjustable shock absorber of claim 1, further comprising:

a solenoid that moves the support along the longitudinal axis, wherein the solenoid is disposed adjacent the passage, the solenoid includes a piston disposed within the fluid passage, and movement of the solenoid piston alters fluid pressure within the fluid passage and second fluid chamber, thereby causing the support to slide along the longitudinal axis in response thereto.

4. The adjustable shock absorber of claim 1, further comprising:

a solenoid that moves the support along the longitudinal axis, wherein the solenoid includes a piston disposed within the shock rod connected to the support and displacement of the solenoid piston causes the support to slide along the longitudinal axis.

5. An adjustable shock absorber, comprising:

a shock rod having a longitudinal axis;

a shock body disposed around a portion of the shock rod, the shock body defining a first fluid chamber therein and being slidable along the longitudinal axis;

a piston disposed on the shock rod in sealing engagement with the shock body, the piston having at least one channel therethrough in communication with the first fluid chamber;

at least one valve in fluid communication with the at least one channel to control fluid movement through the at least channel;

a support movable longitudinally along the shock rod and disposed adjacent to the valve;

an adjustment mechanism for altering a longitudinal position of the support to adjust the valve's operation thereby altering the fluid movement through the at least one channel, the adjustment mechanism comprising:

a first rod disposed through a portion of the shock rod, the first rod being connected to the support and extending exterior to the shock body, wherein longitudinal movement of the first rod causes the movable support to slide along the longitudinal axis of the shock rod; and a second rod connected to the first rod adjacent the exterior of the shock body, the second rod passing through one of a rod eye and the shock rod, wherein displacement of the second rod is applied to the first rod to longitudinally move the first rod in relation to the shock rod and longitudinal movement of the first rod causes the support to slide along the longitudinal axis.

6. The adjustable shock absorber of claim 5, further comprising:

a solenoid that moves the support along the longitudinal axis; and a linkage between the solenoid and the second rod, wherein the solenoid actuates rotational movement of the second rod, which is applied to the first rod to longitudinally move the first rod in relation to the shock rod and cause the support to slide along the longitudinal axis.

7. A snowmobile, comprising:

a chassis;

an engine disposed on the chassis;

at least one ski disposed on the chassis;

an endless track disposed below the chassis and being operatively connected to the engine for propelling the snowmobile;

a steering column operatively connected to the at least one ski for steering the snowmobile; and an adjustable shock absorber including:

a shock rod having a longitudinal axis, a shock body disposed around a portion of the shock rod, the shock body defining a first fluid chamber therein and being slidable along the longitudinal axis, a piston disposed on the shock rod in sealing engagement with the shock body, the piston having at least one channel therethrough in communication with the first fluid chamber, at least one valve in fluid communication with the at least one channel to control fluid movement through the at least one channel, a support movable longitudinally along the shock rod and disposed adjacent to the valve; and an adjustment mechanism for altering a longitudinal position of the support to adjust the valve's operation thereby altering the fluid movement through the at least one channel, the adjustment mechanism comprising:

a support housing disposed on the shock rod adjacent the support, wherein the support sealingly engages with the support housing to define a second fluid chamber;

a fluid passage defined within the shock rod extending from the second fluid chamber to a position along the shock rod exterior to the shock body; and a screw communicating with a portion of the fluid passage exterior to the shock body, wherein adjustment of the screw alters fluid pressure within the fluid passage and second fluid chamber, thereby causing the support to slide along the longitudinal axis in response thereto.

8. The snowmobile of claim 7, further comprising:

a solenoid that moves the support along the longitudinal axis; and a linkage between the solenoid and the screw, wherein actuation of the solenoid rotates the screw to alter fluid pressure within the fluid passage and second fluid chamber, thereby causing the support to slide along the longitudinal axis in response thereto.

9. The snowmobile of claim 7, further comprising:

a solenoid that moves the support along the longitudinal axis, wherein the solenoid is disposed adjacent the passage, the solenoid includes a piston disposed within the passage, and movement of the solenoid piston alters fluid pressure within the fluid passage and second fluid chamber, thereby causing the support to slide along the longitudinal axis in response thereto.

10. The snowmobile of claim 7, further comprising:

a solenoid that moves the support along the longitudinal axis, wherein the solenoid includes a piston disposed within the shock rod connected to the support and displacement of the solenoid piston causes the support to slide along the longitudinal axis.

11. A snowmobile, comprising:

a chassis;

an engine disposed on the chassis;

at least one ski disposed on the chassis;

an endless track disposed below the chassis and being operatively connected to the engine for propelling the snowmobile;

a steering column operatively connected to the at least one ski for steering the snowmobile; and an adjustable shock absorber including:
- a shock rod having a longitudinal axis,
- a shock body disposed around a portion of the shock rod, the shock body defining a first fluid chamber therein and being slidable along the longitudinal axis,
- a piston disposed on the shock rod in sealing engagement with the shock body, the piston having at least one channel therethrough in communication with the first fluid chamber,
- at least one valve in fluid communication with the at least one channel to control fluid movement through the at least one channel,
- a support movable longitudinally along the shock rod and disposed adjacent to the valve;
- an adjustment mechanism for altering a longitudinal position of the support to adjust the valve's operation thereby altering the fluid movement through the at least one channel, the adjustment mechanism comprising:
    - a first rod disposed through a portion of the shock rod, the first rod being connected to the support and extending exterior to the shock body, wherein longitudinal movement of the first rod causes the movable support to slide along the longitudinal axis of the shock rod and
    - a second rod connected to the first rod adjacent the exterior of the shock body, the second rod passing through one of a rod eye and the shock rod,
    - wherein displacement of the second rod is applied to the first rod to longitudinally move the first rod in relation to the shock rod and longitudinal movement of the first rod causes the support to slide along the longitudinal axis.

12. The snowmobile of claim 11, further comprising:

a solenoid that moves the support along the longitudinal axis; and a linkage between the solenoid and the second rod, wherein the solenoid actuates rotational movement of the second rod, which is applied to the first rod to longitudinally move the first rod in relation to the shock rod and cause the support to slide along the longitudinal axis.

\* \* \* \* \*